United States Statutory Invention Registration [19]

[11] Reg. Number: H876

Gilmore et al. [43] Published: Jan. 1, 1991

[54] BITUMEN COMPOSITION

[76] Inventors: Dennis W. Gilmore, 1311 Rustic Knolls; James R. Erickson, 21735 Park Brook Dr., both of Katy, Tex. 77450; James H. Collins, 16318 Espinosa Dr., Houston, Tex. 77083

[21] Appl. No.: 273,146

[22] Filed: Nov. 17, 1988

Related U.S. Application Data

[63] Continuation of Ser. No. 121,426, Nov. 16, 1987, abandoned.

[51] Int. Cl.[5] ..... C08L 95/00
[52] U.S. Cl. ..... 524/68
[58] Field of Search ..... 524/68

[56] References Cited

U.S. PATENT DOCUMENTS

| | | | |
|---|---|---|---|
| 3,615,803 | 10/1971 | Draper et al. | 106/280 |
| 3,700,633 | 10/1972 | Wald et al. | 260/880 B |
| 3,915,914 | 10/1975 | Binder et al. | 260/28.5 |
| 3,985,830 | 10/1976 | Fetters et al. | 260/880 B |
| 4,108,945 | 8/1978 | Fetters et al. | 525/122 |
| 4,115,335 | 9/1978 | Ruesser et al. | 777/216 |
| 4,145,322 | 3/1979 | Maldonado et al. | 428/489 |
| 4,163,764 | 8/1979 | Nash | 525/2 |
| 4,217,259 | 8/1980 | Bresson | 524/66 |
| 4,391,949 | 7/1983 | St. Clair | 524/274 |
| 4,405,680 | 9/1983 | Hansen | 428/285 |
| 4,444,953 | 4/1984 | St. Clair | 524/274 |
| 4,530,652 | 7/1985 | Buck et al. | 570/107 |

FOREIGN PATENT DOCUMENTS 2010289A 6/1979 United Kingdom .

*Primary Examiner*—John F. Terapane
*Assistant Examiner*—Chhaya Sayala

[57] ABSTRACT

A bitumen composition comprising an asymmetric, radial polymer containing a plurality of block copolymer arms comprising at least one polymeric block of a monoalkenyl aromatic hydrocarbon and at least one polymeric block of a conjugated diolefin polymer and a plurality of conjugated diolefin polymer arms. The bitumen composition exhibits increased toughness and tenacity as determined by the Benson method and is particularly useful in road paving applications. Best results are achieved when the asymmetric, radial block copolymer is sulfur vulcanized after incorporation into the bitumen composition.

23 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BITUMEN COMPOSITION

This is a continuation of application Ser. No. 07/121,426, filed Nov. 16, 1987, now abandoned.

BACKGROUND

1. Field of the Invention

This invention relates to a bitumen composition. More particularly this invention relates to a composition comprising bitumen and a polymeric modifier.

2. Prior Art

Bitumen compositions, particularly asphalt compositions, comprising one or more polymeric modifiers are, of course, well known in the prior art. In general, the addition of a polymeric modifier to a bitumen composition, particularly an asphalt composition, will improve one or more of the bitumen properties such as penetration, softening point, toughness, tenacity, heat resistance and the like such as taught in Japanese Patent No. Sho 58(1983)-47057. Suitable polymeric additives include: symmetric radical block copolymers comprising arms having diene polymer blocks and vinyl aromatic polymer blocks such as taught in U.S. Pat. No. 4,217,259; block copolymers of a monoalkenyl aromatic hydrocarbon monomer and a conjugated diolefin such as taught in U.S. Pat. No. 4,585,816 and the patents therein cited; olefin homopolymers and copolymers, particularly 1-butene homopolymers and copolymers, as taught in U.S. Pat. No. 3,915,914 and the patents therein cited; and isoolefin homopolymers, particularly polyisobutylene, such as taught in U.S. Pat. No. 3,615,803.

It is, of course, well known in the prior art to use asphalt compositions comprising polymeric modifiers in the preparation of road surfaces. In general, such road surfaces provide satisfactory service, at least on low traffic roads, for extending periods of time. Failure of such services is, however, inevitable, failures generally occur through bleeding, fatting up, cracking and chip loss. As is well known, the time until failure varies with several factors such as the amount and weight of traffic and various weather factors such as temperature and rainfall. Unfortunately, failure frequently occurs at shorter time intervals than desired. Such failures are due primarily to the poor toughness and tenacity of the asphalt composition. This is particularly true on heavily traveled roadways. The need, then, for an improved asphalt composition having improved toughness and tenacity thereby extending the time period between failures is believed to be readily apparent.

SUMMARY OF THE INVENTION

It is now been discovered that the foregoing and other disadvantages of the prior art bitumen compositions can be avoided or at least significantly reduced with the bitumen composition of the present invention and an improved bitumen composition having increased toughness and tenacity provided thereby. It is, therefore, an object of this invention to provide an improved bitumen composition. It is another object of this invention to provide a bitumen composition having increased toughness. It is still another object of this invention to provide a bitumen composition having increased tenacity. It is yet another object of this invention to provide a bitumen composition that can be used in the preparation of road surfaces capable of handling either more or heavier traffic. It is even another object of this invention to provide a bitumen composition useful in the preparation of road surfaces which will have a longer life before significant failure. The foregoing and other objects and advantages will become apparent from the description of the invention set forth hereinafter.

In accordance with the present invention, the foregoing and other objects and advantages are accomplished with a bitumen composition comprising an asymmetric, radial block copolymer comprising a plurality of arms containing at least one block of a predominantly monoalkenyl aromatic hydrocarbon polymer and at least one block of a predominantly conjugated diolefin polymer and a plurality of arms of a polymer comprising predominantly only conjugated diolefins, said asymmetric, radial block copolymer having a weight average molecular weight of at least 600,000. The arms containing predominantly only conjugated diolefins may be a homopolymer of a conjugated diolefin or a copolymer of two or more conjugated diolefins. As used herein, the recitation "predominantly" is intended to mean that the specified monomer will be the dominant monomeric component (at least 85%) but not necessarily the sole monomeric component. The asymmetric radial block copolymer may be crosslinked after it is incorporated into the bitumen composition.

DETAILED DESCRIPTION OF THE INVENTION

As indicated supra, the present invention is drawn to a bitumen composition comprising an asymmetric block copolymer comprising a plurality of polymeric arms containing at least one monoalkenyl aromatic hydrocarbon polymer block and at least one conjugated diolefin block and a plurality of arms which are, predominantly at least, polymers of one or more conjugated diolefins, said asymmetric, radial block copolymer having a weight average molecular weight of at least 600,000. In general, the bitumen composition of this invention will be useful in any of the applications known in the prior art for such compositions, but as indicated more fully hereinafter, maximum advantage is realized when the bitumen composition is used in the paving of road surfaces. As also indicated more fully hereinafter, the bitumen composition may comprise other materials such as fillers, aggregate, pigments, other synthetic or natural resins, stabilizers, fire retardants, and the like.

In general, any of the natural and synthetic bitumens known in the prior art are suitable for use in the composition of the present invention. Suitable bitumens, then, include natural and synthetic asphalts such as native, rock and lake asphalts as well as petroleum asphalts. The bitumen used in the composition may be neat, highly cracked, residual or air blown. In general, bitumens useful in the composition of the present invention will have penetrations (ASTM method D5) within the range from about 10 to about 800 and, softening points within the range from about 30° C. to about 115° C. Petroleum residual asphalts are particularly useful in the composition of the present invention and are, therefore, preferred.

In general, the asymmetric, radial polymers useful in the bitumen compositions of this invention may be represented by the following general formula:

$$(A\text{-}B)_x Y (\text{-}C)_z$$

wherein:

A—B is a block copolymer arm;

A is a monoalkenyl aromatic hydrocarbon polymer block;

B is a conjugated diolefin polymer block which may be at least partially hydrogenated;

C is a conjugated diolefin polymer arm which may contain the same or a different conjugated diolefin as is contained in B and which may be at least partially hydrogenated;

x+z equals a number from about 6 to about 30;

x/z ranges from about 5 to 1 to about 1 to 5; and y is the residue of a multifunctional coupling agent.

Such asymmetric polymers are within the teaching of U.S. Pat. Nos. 4,163,764; 4,391,949, 4,444,953 and Canadian Patent No. 997,889, the disclosure of which patents are herein incorporated by reference.

Monoalkenyl aromatic hydrocarbon monomers useful in preparing the monoalkenyl aromatic hydrocarbon polymer blocks include styrene, alkyl substituted styrenes, paramethyoxystyrene, vinyl naphthalene, vinyl toluene and the like. Conjugated diolefins useful in preparing the conjugated diolefin polymer blocks include the conjugated diolefins having from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like.

In general, suitable asymmetric, radial polymers may be prepared by first preparing a suitable mixture of living polymeric arms and then reacting the mixture with a polyfunctional (multifunctional) coupling agent. As is well known in the prior art, and taught in the just above-referenced U.S. patents, the living polymer arms may be prepared via anionic polymerization. The different arms may be prepared separately and then combined, or, in effect, prepared simultaneously by adding additional catalysts or initiator after preparation of the mono-alken aromatic hydrocarbon polymer block has been completed and just before the conjugated diolefin block is grown in the block copolymer. Suitable asymmetric, radial polymers may also be prepared by first coupling a plurality of one of the arms and then, in effect, growing the other from the lithium sites incorporated into the nucleus as a result of the initial coupling. This method of preparing asymmetric, radial polymers is taught, for Example, in U.S. Pat. Nos. 3,985,830 and 4,108,945, the disclosure of which patents is herein incorporated by reference.

In general, the asymmetric, radial polymers useful in the bitumen composition of this invention will comprise from about 2 to about 25 block copolymer arms, on average, comprising at least one monoalkenyl aromatic hydrocarbon polymer block and at least one conjugated diolefin polymer block and from about 2 to about 25 arms, on average, which are a conjugated diolefin polymer, the ratio of block copolymer arms to conjugated diolefin polymer arms being within the range from about 5:1 to about 1:5. In general, each of the monoalkenyl aromatic hydrocarbon polymer blocks will have a weight average molecular weight within the range from about 2,000 to about 50,000 and each of the conjugated diolefin polymeric blocks will have a weight average molecular weight within the range from about 5,000 to about 150,000. In general, the conjugated diolefin polymer arms will have a weight average molecular weight within the range from about 5,000 to about 150,000. The asymmetric, radial polymers useful in the bitumen composition of this invention, will, however, have a weight average molecular weight within the range from about 600,000 to about 2,500,000. It will, therefore, be necessary to control both the number of arms and the molecular weights thereof, within the foregoing ranges, so as to insure that the weight average molecular weight of the final polymer, before crosslinking, is within the range of about 600,000 to about 2,500,000. The molecular weight of the several arms need not, of course, be the same. In fact, a useful asymmetric, radial polymer could not be prepared with all of its arms having molecular weights at or near the lower portion of the foregoing molecular weight ranges. Similarly, a final polymer having more than about 16 arms, each arm having a molecular weight at or near the top of the foregoing molecular weight ranges, would not be useful in the bitumen composition of this invention.

The asymmetric, radial polymer may, but need not, be hydrogenated such that up to about 98% of the residual unsaturation contained in both the conjugated diolefin polymer blocks of the copolymer arms and the conjugated diolefin polymer arms is eliminated via saturation thereof. The hydrogenation will be accomplished selectively such that less than about 5 wt% of the unsaturation contained in the monoalkenyl aromatic hydrocarbon blocks is converted or saturated. In a most preferred embodiment of the invention, the selective hydrogenation will be accomplished via the selective hydrogenation technique taught in U.S. Pat. No. 3,700,633. When selective hydrogenation is accomplished, care should be exercised to accomplish the hydrogenation in such a manner as to retain sufficient unsaturation to permit sulfur vulcanization if sulfur vulcanization is to also be accomplished in a manner as hereinafter taught.

In general, the bitumen composition of this invention will comprise from about 1 to about 20 parts, by weight, of asymmetric, radial polymer per 100 parts, by weight, of bitumen in said composition. Surprisingly, it has been discovered that bitumen compositions comprising from about 1 to about 12 parts, by weight, of asymmetric, radial polymer per 100 parts, by weight, of bitumen exhibit a significant increase in toughness and tenacity, as determined using the Benson method, Instron tester, in-lb at 77° F., 20 in-min pull with a tension head having 2.223 cm diameter, when compared to bitumen compositions comprising the same concentration of a more conventional, prior art polymeric modifier. The difference in toughness and tenacity values so determined, however, diminishes rapidly at concentrations of asymmetric, radial polymer above about 12 parts, by weight, per 100 parts, by weight, of bitumen until the values of toughness, tenacity and other key properties reach values comparable those of the more conventional, prior art polymeric modifiers. Bitumen compositions comprising from about 1 to about 12 parts, by weight, of asymmetric, radial polymer per 100 parts, by weight, bitumen, are therefore, preferred and compositions comprising from about 3 to about 6 parts, by weight, per 100 parts, by weight, of bitumen are most preferred.

In general, the asymmetric, radial polymer useful in the bitumen compositions of this invention may be combined with the bitumen using any of the methods known heretofore in the prior art for combining such materials. Suitable methods, then, include simple admixture of the components at ambient conditions, admixture with both components in a molten state with agitation and admixtures of solutions of both components. As is known in the prior art, when one or both of the components is admixed in the solid state it will be advantageous to finely divide the solid component or components prior to admixture. As is also well known in the prior art, molten phase admixture can be accomplished by heating both components to a temperature above their respective melting points. As is further known in the prior art, solution admixture may be accomplished by dissolving the two components in a suitable solvent, which solvent may be the same or different, and thereafter evaporating the solvent. As indicated more fully hereinafter, admixture of solid polymer components in the molten asphalt phase is generally the most conventional way to combine the components and is, therefore, preferred.

After the asymmetric, radial block copolymer has been incorporated into the bitumen, the same way, but need not, be sulfur vulcanized using the techniques known in the prior art, such as the method taught in U.S. Pat. No. 4,145,322, the disclosure of which patent is herein incorporated by reference, to further improve various properties of the composition such as both toughness and tenacity. Best results are, however, realized when the asymmetric, radial polymer is sulfur vulcanized after its incorporation into the bitumen composition. Sulfur vulcanization is, therefore, preferred. In general, sulfur vulcanization can be accomplished by incorporating from about 0.5 to about 20 mols of elemental sulfur, as $S_8$, per mol of asymmetric radial block copolymer into the preformed bitumen composition and then heating the composition to a temperature within the range from about 160° C. to about 180° C. The sulfur vulcanization can be accomplished at essentially any pressure.

As indicated supra, the bitumen composition of this invention may comprise other additives. The other additives actually incorporated, will, of course, depend upon the ultimate end use of the composition. For example, if the bitumen composition is to be used as a roofing composition, suitable fillers, pigments, fire retardants and the like may be incorporated. As is well known in the prior art, suitable fillers include asbestos (both as short and long fibers), magnesium silicate, calcium carbonate, micronized silicas, barium sulfate and various hydrated clays. As also well known in the prior art, suitable pigments include carbon black, titanium oxide and the like. As further known in the prior art, suitable fire retardants include halogenated, particularly chlorinated, elastomers and rubbers. In general, such additives will be used at concentrations well known in the prior art. As another example, the bitumen composition of this invention may be used as a coating for various substrates. Again, suitable filters, pigments, fire retardants and the like may be incorporated. As a further example, the bitumen composition of this invention may be used to prepare an asphalt concrete composition which in turn will be used as a paving material. As indicated supra, the bitumen composition of this invention is particularly effective when used in a road surface and such use is, therefore, preferred.

In general, asphalt concrete compositions may be prepared simply by combining the bitumen composition of this invention with a suitable aggregate such as chat, sand, screened pebbles, rock and the like. In general, the particle size of th®aggregate will vary depending upon the particular application in which the asphalt concrete is used. For paving applications, individual states and localities have their own specifications which define the aggregate as a mixture of various particle size materials combined such that the void spaces will vary from about 3 to about 25%. A 6% void is generally considered normal for most highway and street paving applications. In general, an asphalt concrete within the scope of this invention will comprise from about 4 to about 10 wt% of a bitumen composition within the scope of this invention and from about 96 to about 90 wt% aggregate. Such an asphalt composition would, then, comprise from about 3.3 to about 9.96 wt% bitumen, from about 0.04 to about 1.7 wt% asymmetric, radial polymer and from about 90 to about 96 wt% aggregate. Asphalt concrete compositions may be prepared according to any of the techniques well known in the prior art, such as the methods summarized in U.S. Pat. No. 4,217,259, the disclosure of which patent is herein incorporated by reference.

PREFERRED EMBODIMENT OF THE INVENTION

In a preferred embodiment of the present invention, a petroleum residual asphalt having a penetration within the range from about 75 to about 400 (ASTM method D5) and, a softening point within the range from about 30° C. to about 75° C. will be combined with from about 1 to about 12 parts, by weight, per 100 parts by weight, of asphalt, most preferably with from about 3 to about 6 parts, by weight, per 100 parts by weight of asphalt of an asymmetric, radial polymer having a plurality of block copolymer arms and a plurality of homopolymer arms. In the preferred embodiment, the asymmetric, radial polymer will have from about 8 to about 20 total arms. In the preferred embodiment, the block copolymer arms will comprise one block of polystyrene and one block of polybutadiene or polyisoprene and the homopolymer arms will be a homopolymer of either butadiene or isoprene. In the preferred embodiment, the ratio of block copolymer arms to homopolymer arms will be within the range from 3:1 to 1:3. In the preferred embodiment, the polystyrene blocks will have a molecular weight within the range from about 3,000 to about 30,000, most preferably 10,000 to 25,000 and the conjugated diolefin polymeric block will have a molecular weight within the range from about 15,000 to about 100,000, most preferably 25,000 to 85,000. Also, in the preferred embodiment, the conjugated diolefin homopolymer arms will have a molecular weight within the range from about 15,000 to about 100,000, most preferably 25,000 to 85,000. Still in a preferred embodiment, the asymmetric, radial polymer will have a weight average molecular weight within the range from about 750,000 to about 1,800,000, the number and the molecular weight of the several arms again being controlled so as to insure the production of final polymer having a weight average molecular weight within this range. In the preferred embodiment, the asymmetric, radial polymer will be sulfur vulcanized after its incorporation into the bitumen composition.

In a preferred embodiment of the present invention, the preferred bitumen composition will be used in the preparation of an asphalt concrete. The asphalt concrete will be prepared by combining from about 93 to about 95 wt% of an aggregate with from about 5 to about 7 wt% a performed bitumen composition comprising from about 1 to about 12 parts, most preferable from about 3 to about 6 parts, of an asymmetric, radial polymer per 100 parts, by weight, asphalt. The resulting asphalt concrete will, then, contain from about 93 to about 95 weight percent aggregate, from about 4.5 to about 6.95 wt%, most preferable from about 4.7 to about 6.8 wt%, asphalt and from about 0.05 to about 0.75 wt%, most preferably from about 0.15 to about 0.4 wt% asymmetric, radial polymer. The asphalt concrete will be prepared by combining the aggregate and bitumen composition at a temperature within the range from about 150° to about 200° C. in a suitable mixing apparatus.

Having thus broadly described the present invention and a preferred and most preferred embodiment thereof, it is believed that the same will become even more apparent by reference to the following Examples. It will be appreciated, however, that the examples are presented solely for purposes of illustration and should not be construed as limiting the invention.

EXAMPLE 1

In this example, a series of asphalt compositions were prepared using different block copolymers, one of which was within the scope of this invention, or different block copolymer mixtures. With one exception, the asphalt compositions were prepared with both vulcanized and unvulcanized polymers. In those blends when the polymer was vulcanized, elemental sulfur was added to the asphalt composition after it was formed and the asphalt composition containing the sulfur was held at a temperature within the range from about 160° C. to about 180° C. for one hour. Certain of the asphalt compositions were prepared using polymer/oil blends. In these cases, the amount of the polymer/oil blend actually used was adjusted such that the amount of polymer incorporated into each the asphalt compositions remained constant at three percent by weight, of polymer/asphalt blend. All of the asphalt compositions were prepared with an AC-5 asphalt cement. The first of the asphalt compositions prepared in this example was prepared with a block copolymer comprising a single block of polystyrene having a molecular weight of about 15,000 and a single block of polybutadiene having a molecular weight of about 35,000. After preparation of the asphalt composition, two moles of sulfur, as $S_8$, per mole of polymer was added to the asphalt composition and the composition held at a temperature within the range from about 160° C. to about 180° C. for one hour. For convenience, this asphalt composition is hereinafter identified as composition 1. The second and third asphalt compositions were prepared with a tapered diblock polymer having a weight average molecular weight within the range from about 50,000 to about 70,000 and containing a single block of polybutadiene and a single block of styrene. In the first of these two compositions, identified hereinafter as composition 2A, the polymer was used neat. In the second of these compositions, two moles of elemental sulfur, as $S_8$, per mol of polymer, was added to the asphalt composition after preparation and the composition containing the elemental sulfur was held at a temperature within the range from about 160° C. to about 180° C. for one hour. For convenience, this composition is hereinafter identified as 2B. The fourth and fifth bitumen compositions tested in this example were prepared with a triblock polymer having terminal blocks of polystyrene, each having a molecular weight of about 18,000 and an intermediate block of polybutadiene having a weight average molecular weight of about 70,000. As used, the polymer was combined with an equal amount of oil and in both of the bitumen compositions the oil polymer mixture was added to the asphalt in an amount of 6% by weight of oil/polymer/asphalt blend so as to produce a blend containing 3 wt% polymer. In the first of these two bitumen compositions, the polymer was used neat. In the second of these bitumen compositions, after the polymer was dissolved in the asphalt, two moles of elemental sulfur, as $S_8$, was added to the blend and the blend held at a temperature within the range from about 160° C. to about 180° C. for one hour. For convenience, these two bitumen compositions are identified as compositions 3A and 3B, respectively. The sixth, seventh and eighth bitumen compositions tested in this example were prepared with a blend of polymers comprising a diblock identical to that used in bitumen composition 1 and a triblock identical to that used in bitumen compositions 3A and 3B. The polymeric blend, as used, contained an equal weight of an oil. In the first of these three bitumen compositions, the polymer mixture was used neat. In the second of these compositions, two moles of sulfur, as $S_8$, per mole of polymer was added to the bitumen composition and in the third composition, five moles of sulfur, as $S_8$, per mole of polymer was added. Both of the compositions to which sulfur was added were held at a temperature within the range from about 160° C. to about 180° C. for one hour. For convenience, these blends are identified hereinafter as 4A, 4B and 4C, respectively. The ninth and tenth bitumen compositions tested in this example, were prepared with an asymmetric, radial polymer within the scope of the present invention. On average, the asymmetric, radial polymer used contained 12 block copolymer arms each containing a single polystyrene block having a molecular weight of 11,000 and a polyisoprene block having a weight average molecular weight of 60,000 and 6 arms which were homopolymers of isoprene having a weight average molecular weight of 70,000. The average number of total arms (18) was determined using GPC-LALLS. The ratio, on average, of twelve copolymer arms to six homopolymer arms was determined by assuming that this ratio would be the same as it was in the blend of polymer arms prior to coupling with divinylbenzene. In the first of the bitumen composition prepared in accordance with this invention, the asymmetric, radial polymer was used neat. In the second of these bitumen compositions, six moles of elemental sulfur, as $S_8$, per mole of polymer was added to the bitumen composition after preparation and the composition containing the sulfur was held at a temperature within the range from about 160° C. to about 180° C. for one hour. For convenience, these bitumen compositions are hereinafter referred to as compositions 5A and 5B, respectively. The eleventh and twelfth bitumen compositions tested in this example were prepared with a diblock polymer identical to that used in bitumen composition 1. In both of these compositions, the diblock polymer was used as a blend containing 20 wt% naphthenic oil. In the eleventh and twelfth bitumen compositions, the polymer oil blend was added to the asphalt in an amount of 3.75 wt% based on polymer-oil asphalt blend so as to produce an asphalt composition containing 3 wt% polymer in the blend. In the first of three compositions, the polymer was used neat. In the second of these compositions, after the bitumen composition was prepared, two moles of elemental sulfur, as $S_8$, per mole of polymer was added to the composition and the resulting mixture held at a temperature within the range from about 160° C. to about 180° C. for one hour. For convenience, these bitumen compositions are identified hereinafter as compositions 6A and 6B, respectively. The 13th bitumen composition tested in this example was identical to the eleventh and twelfth compositions (6A and 6B)

except that an aromatic oil was used in place of the naphthenic oil. For convenience, the 13th composition is identified as composition 7. The fourteenth and fifteenth bitumen compositions tested in this Example were prepared with an asymmetric, radial polymer having two styrene-butadiene block copolymer arms and two butadiene homopolymer arms. The molecular weight of the styrene blocks was about 20,000 while the molecular weight of the butadiene blocks and the butadiene homopolymer arms was about 36,000. The molecular weight of this asymmetric radial polymer was, then, well below that required for the asymmetric, radial polymer useful in the bitumen compositions of this invention. In the first of these bitumen compositions, the polymer was used neat. In the second of these bitumen compositions, the polymer was sulfur vulcanized after it was incorporated into the bitumen composition. For convenience, the fourteenth and fifteenth bitumen compositions are hereinafter referred to as compositions 8A and 8B respectively. The sixteenth and seventeenth bitumen composition tested in this Example were prepared with asymmetric, radial polymer having four styrene-butadiene block copolymer arms. The molecular weight of the styrene blocks was about 20,000 and the molecular weight of the butadiene blocks was about 40,000. In the first of these compositions, the polymer was used neat and in the second of these compositions the polymer was sulfur vulcanized. For convenience, these compositions are hereinafter respectively referred to as compositions 9A and 9B. The eighteenth and nineteenth bitumen compositions tested in this Example were prepared with a symmetric, radial polymer identical to that used in compositions 9A and 9B except that the molecular weight of the styrene blocks was 12,000 rather than 20,000. Again, the polymer was used neat in the first of these compositions and was sulfur vulcanized in the second of these compositions. For convenience, these compositions are hereinafter referred to, respectively, as compositions 10A and 10B. The twentieth and twenty-first compositions tested in this Example were prepared with a styrene-isoprene-styrene linear triblock copolymer. The styrene blocks each had molecular weights of about 10,000 and the molecular weight of the isoprene block was about 100,000. In the first of these compositions, the polymer was used neat and in the second of these compositions the polymer was sulfur vulcanized after incorporation into the bitumen composition. For convenience, these compositions are hereinafter, respectively, referred to as compositions 11A and 11B. All of the asphalt compositions tested in this example were prepared by mixing in a Silverson LDD laboratory mixer equipped with a 1" tubular general purpose disintegrating head turning at 3,000 rpm. Each of the asphalt compositions was prepared at 160° C. and the time required to dissolve the polymer in the asphalt was determined. After preparation, each of the asphalt compositions were then tested to determine its penetration at 25° C. using ASTM Method D5, to determine its ring and ball softening point in °C. using ASTM D-36, and to determine its toughness and tenacity using the Benson method an Instron Tester, in-lb at 77° F., 20 in/min pull. The tension head used in these tests were 2.223 cm diameter. The type or mode of failure was also determined. The results obtained with each of the compositions as well as other information is summarized in the table below. For comparison purposes, the asphalt used in preparing all of the asphalt compositions was analyzed, without any additives, and the values obtained for the asphalt alone are summarized as asphalt composition 12.

TABLE 1

| Asphalt Composition No. | Time to Dissolution, min. | Penetration at 25° C., dmm | Ring and Ball Softening Point, °C. | Toughness Kg-cm | Tenacity Kg-cm | # Arms | Were Arms Dissimilar | Failure Mode |
|---|---|---|---|---|---|---|---|---|
| 1 | 20–25 | 106 | 54 | 89 | 53 | 1 | — | Cohesive |
| 2A | 60–65 | 114 | 51 | 57 | 16 | 1 | — | Cohesive |
| 2B | 60–65 | 108 | 52 | 73 | 39 | 1 | — | Cohesive |
| 3A | 5–10 | 112 | 51 | 73 | 48 | 2 | No | Cohesive |
| 3B | 5–10 | 113 | 54 | 143 | 112 | 2 | No | Cohesive |
| 4A | 5–10 | 115 | 50 | 99 | 68 | 1.5 | No | Cohesive |
| 4B | 5–10 | 101 | 66 | 148 | 116 | 1.5 | No | Cohesive |
| 4C | 5–10 | 77 | 61 | 78 | 46 | 1.5 | No | Cohesive |
| 5A | 10–15 | 91 | 57 | 150 | 124 | 18 | Yes | Cohesive |
| 5B | 10–15 | 116 | 57 | 237 | 204 | 18 | Yes | Cohesive |
| 6A | 20–25 | 120 | 51 | 58 | 27 | 1 | | |
| 6B | 20–25 | 123 | 55 | 81 | 47 | 1 | — | Cohesive |
| 7 | 5–10 | 101 | 51 | 69 | 43 | 1 | — | Cohesive |
| 8A | 20–25 | 109 | — | 74 | 36 | 4 | Yes | Cohesive |
| 8B | 20–25 | 90 | — | 79 | 47 | 4 | Yes | Cohesive |
| 9A | 100–130 | 91 | — | 183 | 144 | 4 | No | Adhesive |
| 9B | 100–130 | 87 | — | 128 | 96 | 4 | No | Adhesive |
| 10A | 60–65 | — | — | 70 | 38 | 4 | No | Cohesive |
| 10B | 60–65 | — | — | 104 | 70 | 4 | No | Adhesive |
| 11A | 20–25 | — | — | 124 | 87 | 2 | No | Cohesive |
| 11B | 20–25 | — | — | 110 | 69 | 2 | No | Cohesive |
| 12 | | 127 | 47 | 30 | 6 | | | Cohesive |

As will be apparent from the data summarized in the preceding table, inclusion of sulfur into the asphalt composition generally improves both the toughness and tenacity of the resulting asphalt composition (B v. A), except with compositions 9A and 9B and 11 A and 11B. Too each sulfur, however, is apparently detrimental (cf. 4C v. 4B). As will also be apparent from the data summarized in the preceding table, the compositions within the scope of the present invention wherein the asymmetric, radial polymer was used neat gave toughness and tenacity values equal to or better than the values obtained for those compositions containing vulcanized di- and triblock polymers (cf. 5A v. 1, 2B, 3B, 4B, 6B, 8B, 9B, 10B and 11B). Moreover, vulcanization of the asymmetric, radial polymer significantly improved both the toughness and tenacity of the asphalt composition (cf. 5B). As will also be apparent from the data summarized in the preceding Table, the lower molecular weight asymmetric radial polymer used in Compositions 9A and 9B gave good results when used neat but unsatisfactory result after sulfur vulcanization.

EXAMPLE 2

In this Example, four bitumen compositions were prepared wherein a polymeric modifier was incorporated at a concentration of 12 wt% based on the polymer/asphalt blend. The first and second compositions, hereinafter referred to, respectively, as Compositions 13A and 13B, were prepared with an asymmetric, radial polymer within the scope of this invention and identical to the polymer used in Compositions 5A and 5B of Example 1. In the first of these compositions, the polymer was used neat (without sulfur curing) while in the second of these compositions, the polymer was sulfur vulcanized in the same manner as was used in Example 1 by incorporating 2 moles of elemental sulfur, as $S_8$, per mole of polymer into the composition. The third and fourth compositions, hereinafter referred to as Compositions 14A and 14B were prepared, with a block copolymer identical to that used in Composition 1 of Example 1. In the first of these compositions, the polymer was used neat while in the second of these compositions, the polymer was sulfur vulcanized in the same manner as was used in vulcanizing the polymers in certain of the compositions of Example 1 by adding 2 mols of sulfur, as $S_8$, per mole of polymer to the composition. Each of the compositions were prepared in the same manner as was used in preparation of the compositions of Example 1. The asphalt used in each composition was identical to that used in the compositions of Example 1. After preparation, each of the asphalt compositions were tested to determine the penetration at 25° C. and the ring and ball softening point in 0 C. using the same test procedures as were used in Example 1. Each composition was also tested to determine its tensile strength in psi using ASTM D412. The results obtained with each composition are summarized in the following Table:

TABLE

| Composition No. | Penetration at 25° C., dmm | Ring and Ball Softening Point, °C. | Tensile Strength, psi |
|---|---|---|---|
| 13A | 58 | 178 | 22 |
| 13B | 71 | 182 | 38 |
| 14A | 111 | 191 | 23 |
| 14B | 74 | 197 | 47 |

As will be apparent from the data summarized in the foregoing Table, the tensile strength of the compositions containing unvulcanized (neat) polymer as well as the tensile strength of the compositions containing vulcanized polymer are approaching the same values. This is, of course, in contrast to the significant difference exhibited with compositions containing only 3 wt% polymer in the polymer/asphalt blend as reflected by the toughness and tenacity value obtained in Example 1 (compare compositions 1 and 5B). It follows from this that maximum improvement is realized when the asymmetric, radial polymer is used in compositions at concentrations more commonly used in road paving compositions.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having this described and illustrated the present invention, what is claimed is:

1. A bitumen composition comprising an asymmetric, radial polymer comprising a plurality of arms which contain at least one polymeric block of a monoalkenyl aromatic hydrocarbon and at least one polymeric block of a conjugated diolefin and a plurality of arms which are a conjugated diolefin polymer, said asymmetric, radial polymer having a weight average molecular weight of at least 600,000.

2. The bitumen composition of claim 1 wherein said asymmetric, radial polymer comprises from about 2 to about 25 block copolymer arms and from about 2 to about 25 conjugated diolefin polymer arms, the ratio of said arms being within the range from about 5:1 to about 1:5.

3. The bitumen composition of claim 2 wherein said asymmetric, radial polymer is present in said bitumen composition at a concentration within the range from about 1 to about 12 parts by weight, per 100 parts by weight of bitumen.

4. The bitumen composition of claim 3 wherein said monoalkenyl aromatic hydrocarbon is styrene.

5. The bitumen composition of claim 4 wherein said polymeric block of a conjugated diolefin is a block of polybutadiene.

6. The bitumen composition of claim 4 wherein said polymeric block of a conjugated diolefin is a block of polyisoprene.

7. The bitumen composition of claim 4 wherein said conjugated diolefin polymer is a homopolymer of butadiene.

8. The bitumen composition of claim 4 wherein said conjugated diolefin polymer is a homopolymer of isoprene.

9. The bitumen composition of claim 2 wherein the monoalkenyl aromatic hydrocarbon polymer block has a weight average molecular weight within the range from about 2,000 to about 50,000 and the conjugated diolefin polymer blocks have a weight average molecular weight within the range from about 5,000 to about 150,000.

10. The bitumen composition of claim 9 wherein said conjugated diolefin polymer has a weight average molecular weight within the range from about 5,000 to about 150,000.

11. The bitumen composition of claim 2 wherein said asymmetric, radial polymer is sulfur vulcanized.

12. The bitumen composition of claim 1 wherein said asymmetric, radial polymer comprises from about 8 to about 20 arms and the ratio of block copolymer arms to conjugated diolefin polymer arms is within the range from about 3:1 to about 1:3.

13. The bitumen composition of claim 1 wherein said asymmetric, radial polymer has a weight average molecular weight within the range from about 600,000 to about 2,500,000.

14. An asphalt concrete composition comprising from about 0.04 to about 1.7 wt% of an asymmetric, radial polymer, comprising a plurality of arms which contain at least one polymeric block of a monoalkenyl aromatic hydrocarbon and at least one polymeric block of a conjugated diolefin and a plurality of arms which are a conjugated diolefin polymer, having a weight average molecular weight of at least 600,000, from about 3.3 to about 9.96 wt% bitumen and from about 90 to about 96 wt% bitumen and from about 90 to about 96 wt% aggregate.

15. The asphalt concrete composition of claim 14 wherein said asymmetric, radial polymer comprises from about 2 to about 25 block copolymer arms and from about 2 to about 25 conjugated diolefin polymer arms, the ratio of said arms being within the range from about 5:1 to about 1:5.

16. The asphalt concrete composition of claim 15 wherein said asymmetric, radial polymer has from about 8 to about 20 arms and the ratio of block copolymer arms to conjugated diolefin polymer arms is within the range from about 3:1 to about 1:3.

17. The asphalt concrete composition of claim 16 wherein the monoalkenyl aromatic hydrocarbon is styrene and the conjugated diolefin is isoprene.

18. The asphalt concrete composition of claim 17 wherein said asymmetric, radial polymer has a weight average molecular weight within the range from about 600,000 to about 2,500,000.

19. The asphalt concrete composition of claim 16 wherein the monoalkenyl aromatic hydrocarbon is styrene and the conjugated diolefin is butadiene.

20. The asphalt concrete composition of claim 19 wherein said asymmetric, radial polymer has a weight average molecular weight within the range from about 600,000 to about 2,500,000.

21. The bitumen composition of claim 12 wherein said asymmetric, radial polymer is present in said bitumen composition at a concentration within the range from about 3 to about 6 parts by weight, per 100 parts by weight of bitumen.

22. The bitumen composition of claim 13 wherein said asymmetric, radial polymer has a weight average molecular weight within the range from about 750,000 to about 1,800,000.

23. The asphalt concrete composition of claim 20 wherein said asymmetric, radial polymer has a weight average molecular weight within the range from about 750,000 to about 1,800,000.

* * * * *